United States Patent
Kim et al.

(10) Patent No.: US 10,355,838 B2
(45) Date of Patent: Jul. 16, 2019

(54) METHOD FOR TRANSMITTING APERIODIC REFERENCE SIGNAL FOR CHANNEL STATUS INFORMATION FEEDBACK IN WIRELESS COMMUNICATION SYSTEM AND DEVICE THEREFOR

(71) Applicant: LG ELECTRONICS INC., Seoul (KR)

(72) Inventors: Hyungtae Kim, Seoul (KR); Jonghyun Park, Seoul (KR); Bonghoe Kim, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/559,503

(22) PCT Filed: Mar. 29, 2016

(86) PCT No.: PCT/KR2016/003188
§ 371 (c)(1),
(2) Date: Sep. 19, 2017

(87) PCT Pub. No.: WO2016/159629
PCT Pub. Date: Oct. 6, 2016

(65) Prior Publication Data
US 2018/0123755 A1  May 3, 2018

Related U.S. Application Data

(60) Provisional application No. 62/141,216, filed on Mar. 31, 2015.

(51) Int. Cl.
*H04L 5/00* (2006.01)
*H04B 7/06* (2006.01)

(52) U.S. Cl.
CPC ......... *H04L 5/0048* (2013.01); *H04B 7/0617* (2013.01); *H04B 7/0626* (2013.01);
(Continued)

(58) Field of Classification Search
CPC ... H04L 5/0048; H04L 5/0053; H04L 5/0057; H04L 5/005; H04B 7/0617; H04B 7/0626
See application file for complete search history.

(56) References Cited

U.S. PATENT DOCUMENTS

2013/0322276 A1* 12/2013 Pelletier ............ H04W 72/085
370/252
2014/0078919 A1* 3/2014 Hammarwall ....... H04L 5/0057
370/252
(Continued)

FOREIGN PATENT DOCUMENTS

KR  10-2015-0030197 A  3/2015

OTHER PUBLICATIONS

R1-150164: ZTE, GPP TSG RAN WG1 Meeting #80, Athens, Greece, Feb. 9-13, 2015, "Discussion on Apperiodic and Beamfomied CSI-RS Schemes."

*Primary Examiner* — Ajay Cattungal
(74) *Attorney, Agent, or Firm* — Dentons US LLP

(57) ABSTRACT

Disclosed is a method by which a terminal transmits channel status information (CSI) feedback in a wireless communication system. Particularly, the method for transmitting CSI feedback comprises the steps of: setting, through an upper layer signal, one CSI process having a periodic reference signal and an aperiodic reference signal; receiving, from a base station, an aperiodic CSI feedback request message related to the one CSI process; generating, in response to the aperiodic CSI feedback request message, aperiodic CSI feedback on the basis of the aperiodic reference signal; and transmitting the aperiodic CSI feedback to the base station.

8 Claims, 10 Drawing Sheets

(52) U.S. Cl.
CPC ............ *H04L 5/005* (2013.01); *H04L 5/0053* (2013.01); *H04L 5/0057* (2013.01)

(56) References Cited

U.S. PATENT DOCUMENTS

| | | |
|---|---|---|
| 2014/0086084 A1 | 3/2014 | Bi et al. |
| 2014/0334391 A1* | 11/2014 | Khoshnevis ...... H04W 72/0413 370/329 |
| 2016/0219570 A1* | 7/2016 | Guo ...................... H04L 5/0048 |
| 2018/0146441 A1* | 5/2018 | Takaoka .............. H04W 52/367 |

\* cited by examiner

FIG. 2
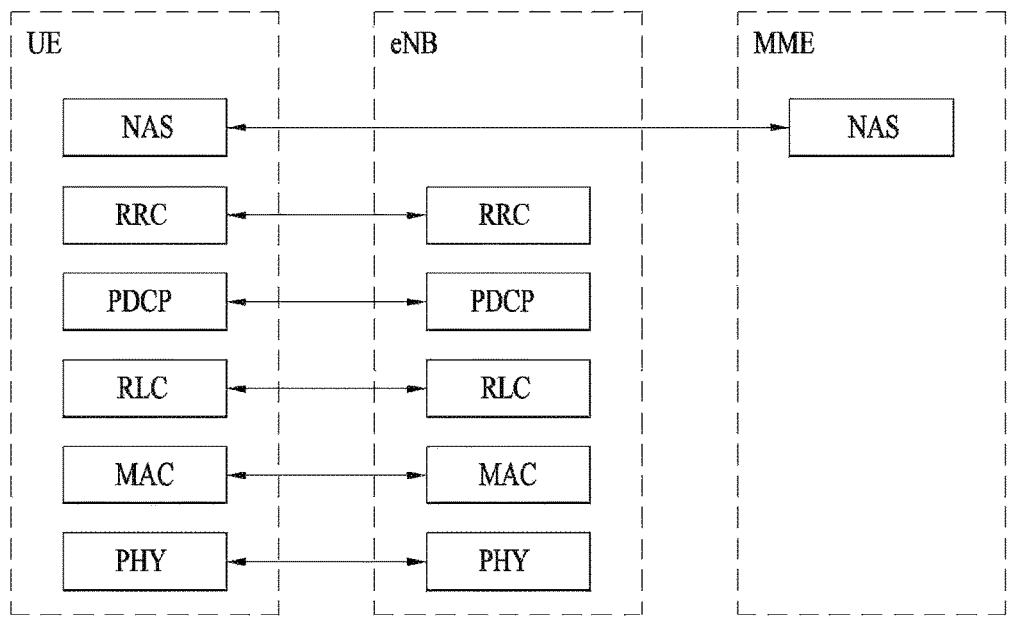
(A) CONTROL-PLANE PROTOCOL STACK
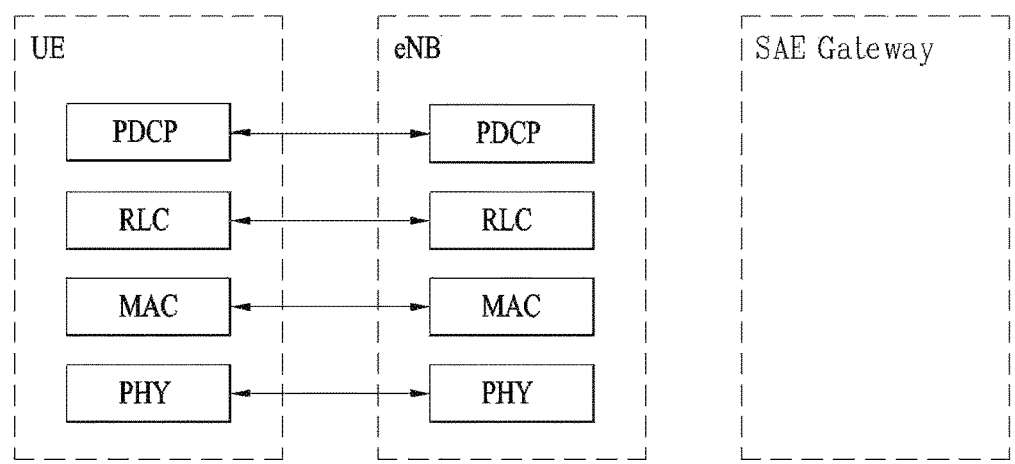
(B) USER-PLANE PROTOCOL STACK

METHOD FOR TRANSMITTING APERIODIC REFERENCE SIGNAL FOR CHANNEL STATUS INFORMATION FEEDBACK IN WIRELESS COMMUNICATION SYSTEM AND DEVICE THEREFOR

This application is a 35 USC § 371 National Stage entry of International Application No. PCT/KR2016/003188 filed on Mar. 29, 2016, and claims priority to U.S. Provisional Application No. 62/141,216 filed on Mar. 31, 2015, all of which are hereby incorporated by reference in their entireties as if fully set forth herein.

TECHNICAL FIELD

The present invention relates to a wireless communication system, and more particularly, to a method for transmitting an aperiodic reference signal for channel status information (CSI) feedback in a wireless communication system and device therefor.

BACKGROUND ART

As an example of a wireless communication system to which the present invention is applicable, a 3rd Generation Partnership Project Long Term Evolution (3GPP LTE) (hereinafter, referred to as 'LTE') communication system is briefly described.

FIG. 1 is a view schematically illustrating the network architecture of an E-UMTS as an exemplary wireless communication system. An Evolved Universal Mobile Telecommunications System (E-UMTS) is an advanced version of a legacy Universal Mobile Telecommunications System (UMTS) and standardization thereof is currently underway in the 3GPP. E-UMTS may be generally referred to as an LTE system. For details of the technical specifications of UMTS and E-UMTS, reference can respectively be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of a network (Evolved-Universal Terrestrial Radio Access Network ((E-UTRAN)) and connected to an external network. The eNBs may simultaneously transmit multiple data streams for a broadcast service, a multicast service, and/or a unicast service.

One or more cells may exist in one eNB. A cell is configured to use one of bandwidths of 1.25, 2.5, 5, 10, 20 MHz to provide a downlink or uplink transport service to several UEs. Different cells may be configured to provide different bandwidths. The eNB controls data transmission and reception for a plurality of UEs. The eNB transmits downlink scheduling information for downlink data to notify a corresponding UE of a data transmission time/frequency domain, coding, data size, and Hybrid Automatic Repeat and reQuest (HARQ)-related information. In addition, the eNB transmits uplink scheduling information for uplink data to inform a corresponding UE of available time/frequency domains, coding, data size, and HARQ-related information. An interface for transmitting user traffic or control traffic may be used between eNBs. A Core Network (CN) may include an AG and a network node for user registration of the UE. The AG manages mobility of the UE on a Tracking Area (TA) basis, wherein one TA consists of a plurality of cells.

Although radio communication technology has been developed up to LTE based on Wideband Code Division Multiple Access (WCDMA), demands and expectations of users and service providers have continued to increase. In addition, since other radio access technologies continue to be developed, new technical evolution is required for future competitiveness. Decrease of cost per bit, increase of service availability, flexible use of a frequency band, simple structure and open interface, and suitable power consumption by a UE are required.

DISCLOSURE OF THE INVENTION

Technical Task

Based on the above-described discussion, the present invention proposes a method for transmitting an aperiodic reference signal for channel status information (CSI) feedback and device therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

In an aspect of the present invention, provided herein is a method for transmitting channel status information (CSI) feedback by a user equipment (UE) in a wireless communication system, including: configuring a single CSI process including a periodic reference signal and an aperiodic reference signal through a higher layer signal; receiving an aperiodic CSI feedback request message related to the single CSI process from an evolved node B (eNB); generating aperiodic CSI feedback based on the aperiodic reference signal in response to the aperiodic CSI feedback request message; and transmitting the aperiodic CSI feedback to the eNB.

Preferably, the CSI feedback transmission method may further include: configuring a CSI feedback report period for the single CSI process through the higher layer signal; and transmitting periodic CSI feedback generated based on the periodic reference signal to the eNB according to the CSI feedback report period.

More preferably, generating the aperiodic CSI feedback may include: generating first CSI feedback based on the aperiodic reference signal; and generating second CSI feedback based on the periodic reference signal, wherein the aperiodic CSI feedback may include the first and second CSI feedback. In this case, CSI reference resources for receiving the aperiodic and periodic reference signals may be defined according to the number of reference signals included in the single CSI process.

In another aspect of the present invention, provided herein is a user equipment (UE) in a wireless communication system, including: a wireless communication module for transmitting and receiving signals to and from an evolved node B (eNB); and a processor for processing the signals, wherein the processor may be configured to configure a single channel status information (CSI) process including a periodic reference signal and an aperiodic reference signal through a higher layer signal, generate aperiodic CSI feedback based on the aperiodic reference signal in response to an aperiodic CSI feedback request message related to the single CSI process received from the eNB, and control the wireless communication module to transmit the aperiodic CSI feedback to the eNB.

Preferably, the processor may be configured to configure a CSI feedback report period for the single CSI process through the higher layer signal and control the wireless communication module to transmit periodic CSI feedback generated based on the periodic reference signal to the eNB according to the CSI feedback report period.

More preferably, the processor may be configured to generate first CSI feedback based on the aperiodic reference signal and generate second CSI feedback based on the periodic reference signal, wherein the aperiodic CSI feedback may include the first and second CSI feedback. In this case, CSI reference resources for receiving the aperiodic and periodic reference signals may be defined according to the number of reference signals included in the single CSI process.

In these aspects, the aperiodic CSI feedback may relate to vertical beamforming of the eNB and the periodic CSI feedback may relate to horizontal beamforming of the eNB.

Advantageous Effects

According to embodiments of the present invention, a user equipment can perform CSI feedback more efficiently based on an aperiodic reference signal.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention:

FIG. 2 illustrates structures of a control plane and a user plane of a radio interface protocol between a UE and an E-UTRAN based on the 3GPP radio access network specification;

BEST MODE FOR INVENTION

Figure 1:
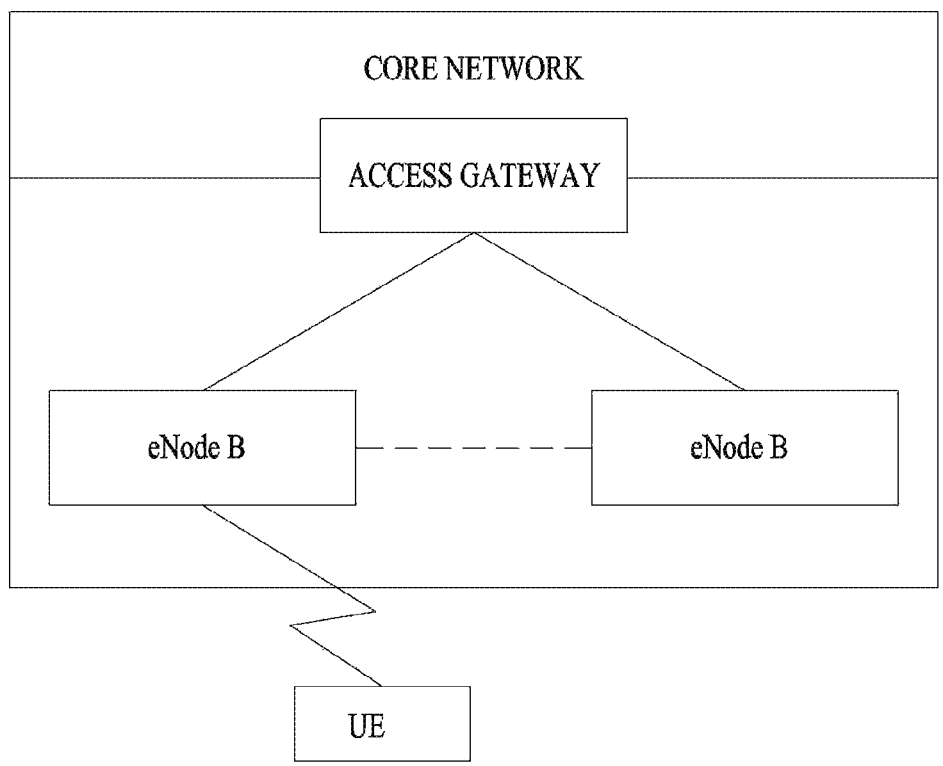
FIG. 1 schematically illustrates the network architecture of an E-UMTS as an exemplary wireless communication system.

Hereinafter, the structures, operations, and other features of the present invention will be understood readily from the embodiments of the present invention, examples of which are described with reference to the accompanying drawings. The embodiments which will be described below are examples in which the technical features of the present invention are applied to a 3GPP system.

Although the embodiments of the present invention will be described based on an LTE system and an LTE-Advanced (LTE-A) system, the LTE system and the LTE-A system are only exemplary and the embodiments of the present invention can be applied to all communication systems corresponding to the aforementioned definition. In addition, although the embodiments of the present invention will herein be described based on Frequency Division Duplex (FDD) mode, the FDD mode is only exemplary and the embodiments of the present invention can easily be modified and applied to Half-FDD (H-FDD) mode or Time Division Duplex (TDD) mode.

FIG. 2 is a view illustrating structures of a control plane and a user plane of a radio interface protocol between a UE and an E-UTRAN based on the 3GPP radio access network specification. The control plane refers to a path through which control messages used by a User Equipment (UE) and a network to manage a call are transmitted. The user plane refers to a path through which data generated in an application layer, e.g. voice data or Internet packet data, is transmitted.

A physical layer of a first layer provides an information transfer service to an upper layer using a physical channel. The physical layer is connected to a Medium Access Control (MAC) layer of an upper layer via a transport channel. Data is transported between the MAC layer and the physical layer via the transport channel. Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A MAC layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 or IPv6 packet in a radio interface having a relatively narrow bandwidth.

A Radio Resource Control (RRC) layer located at the bottommost portion of a third layer is defined only in the control plane. The RRC layer controls logical channels, transport channels, and physical channels in relation to configuration, re-configuration, and release of radio bearers. The radio bearers refer to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

One cell of an eNB is set to use one of bandwidths such as 1.25, 2.5, 5, 10, 15, and 20 MHz to provide a downlink or uplink transmission service to a plurality of UEs. Different cells may be set to provide different bandwidths.

Downlink transport channels for data transmission from a network to a UE include a Broadcast Channel (BCH) for transmitting system information, a Paging Channel (PCH) for transmitting paging messages, and a downlink Shared Channel (SCH) for transmitting user traffic or control messages. Traffic or control messages of a downlink multicast or broadcast service may be transmitted through the downlink SCH or may be transmitted through an additional downlink Multicast Channel (MCH). Meanwhile, uplink transport channels for data transmission from the UE to the network include a Random Access Channel (RACH) for transmitting initial control messages and an uplink SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
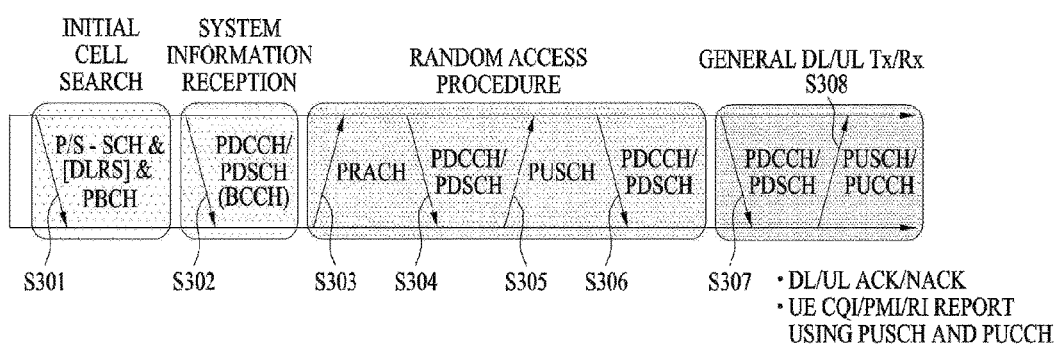
FIG. 3 illustrates physical channels used in a 3GPP system and a general signal transmission method using the same.

FIG. 3 is a view illustrating physical channels used in a 3GPP system and a general signal transmission method using the same.

A UE performs initial cell search such as establishment of synchronization with an eNB when power is turned on or the UE enters a new cell (step S301). The UE may receive a Primary Synchronization Channel (P-SCH) and a Secondary Synchronization Channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a Downlink Reference Signal (DL RS) in the initial cell search step to confirm a downlink channel state.

Upon completion of initial cell search, the UE may receive a Physical Downlink Control Channel (PDCCH) and a Physical Downlink Shared Channel (PDSCH) according to information carried on the PDCCH to acquire more detailed system information (step S302).

Meanwhile, if the UE initially accesses the eNB or if radio resources for signal transmission are not present, the UE may perform a random access procedure (steps S303 to S306) with respect to the eNB. To this end, the UE may transmit a specific sequence through a Physical Random Access Channel (PRACH) as a preamble (steps S303 and S305), and receive a response message to the preamble through the PDCCH and the PDSCH corresponding thereto (steps S304 and S306). In the case of a contention-based RACH, a contention resolution procedure may be additionally performed.

The UE which performs the above procedures may receive a PDCCH/PDSCH (step S307) and transmit a Physical Uplink Shared Channel (PUSCH)/Physical Uplink Control Channel (PUCCH) (step S308) according to a general uplink/downlink signal transmission procedure. Especially, the UE receives Downlink Control Information (DCI) through the PDCCH. The DCI includes control information such as resource allocation information for the UE and has different formats according to use purpose.

Meanwhile, control information, transmitted by the UE to the eNB through uplink or received by the UE from the eNB through downlink, includes a downlink/uplink ACKnowledgment/Negative ACKnowledgment (ACK/NACK) signal, a Channel Quality Indicator (CQI), a Precoding Matrix Index (PMI), a Rank Indicator (RI), and the like. In the case of the 3GPP LTE system, the UE may transmit control information such as CQI/PMI/RI through the PUSCH and/or the PUCCH.

Figure 4:
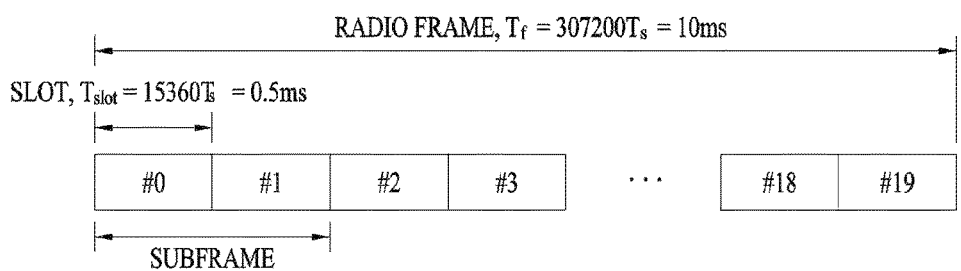
FIG. 4 illustrates the structure of a radio frame used in an LTE system.

FIG. 4 is a view illustrating the structure of a radio frame used in an LTE system.

Referring to FIG. 4, the radio frame has a length of 10 ms (327200 $T_s$) and includes 10 equally-sized subframes. Each of the subframes has a length of 1 ms and includes two slots. Each of the slots has a length of 0.5 ms (15360 $T_s$). In this case, $T_s$ denotes sampling time and is represented by $T_s=1/(15 \text{ kHz} \times 2048)=3.2552 \times 10^{-8}$ (about 33 ns). Each slot includes a plurality of OFDM symbols in a time domain and includes a plurality of Resource Blocks (RBs) in a frequency domain. In the LTE system, one resource block includes 12 subcarriers×7 (or 6) OFDM symbols. A Transmission Time Interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
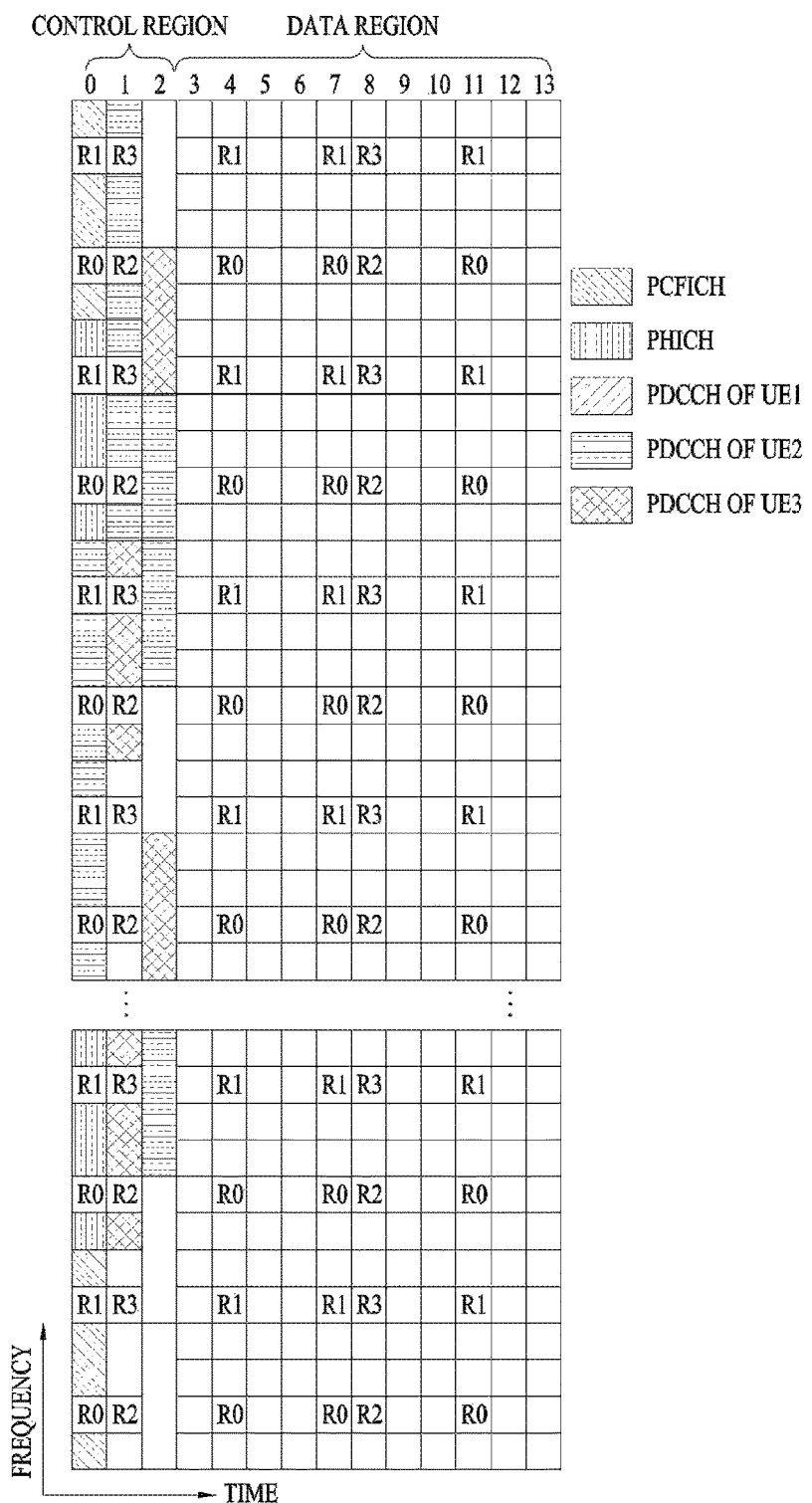
FIG. 5 illustrates the structure of a downlink radio frame used in an LTE system.

FIG. 5 is a view illustrating control channels contained in a control region of one subframe in a downlink radio frame.

Referring to FIG. 5, one subframe includes 14 OFDM symbols. The first to third ones of the 14 OFDM symbols may be used as a control region and the remaining 13 to 11 OFDM symbols may be used as a data region, according to subframe configuration. In FIGS. 5, R1 to R4 represent reference signals (RSs) or pilot signals for antennas 0 to 3, respectively. The RSs are fixed to a predetermined pattern within the subframe irrespective of the control region and the data region. Control channels are allocated to resources to which the RS is not allocated in the control region. Traffic channels are allocated to resources, to which the RS is not allocated, in the data region. The control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH, physical control format indicator channel, informs a UE of the number of OFDM symbols used for the PDCCH per subframe. The PCFICH is located in the first OFDM symbol and is established prior to the PHICH and the PDCCH. The PCFICH is comprised of 4 Resource Element Groups (REGs) and each of the REGs is distributed in the control region based on a cell ID. One REG includes 4 Resource Elements (REs). The RE indicates a minimum physical resource defined as one subcarrier x one OFDM symbol. The PCFICH value indicates values of 1 to 3 or values of 2 to 4 depending on bandwidth and is modulated by Quadrature Phase Shift Keying (QPSK).

The PHICH, physical Hybrid-ARQ indicator channel, is used to transmit a HARQ ACK/NACK signal for uplink transmission. That is, the PHICH indicates a channel through which downlink ACK/NACK information for uplink HARQ is transmitted. The PHICH includes one REG and is cell-specifically scrambled. The ACK/NACK signal is indicated by 1 bit and is modulated by Binary Phase Shift Keying (BPSK). The modulated ACK/NACK signal is spread by a Spreading Factor (SF)=2 or 4. A plurality of PHICHs mapped to the same resource constitutes a PHICH group. The number of PHICHs multiplexed to the PHICH group is determined depending on the number of SFs. The PHICH (group) is repeated three times to obtain diversity gain in a frequency domain and/or a time domain.

The PDCCH, physical downlink control channel, is allocated to the first n OFDM symbols of a subframe. In this case, n is an integer greater than 1 and is indicated by the PCFICH. The PDCCH is comprised of one or more Control Channel Elements (CCEs). The PDCCH informs each UE or UE group of information associated with resource allocation of a Paging Channel (PCH) and a Downlink-Shared Channel (DL-SCH), uplink scheduling grant, Hybrid Automatic Repeat Request (HARQ) information, etc. Therefore, an eNB and a UE transmit and receive data other than specific control information or specific service data through the PDSCH.

Information indicating to which UE or UEs PDSCH data is to be transmitted, information indicating how UEs are to receive PDSCH data, and information indicating how UEs are to perform decoding are contained in the PDCCH. For example, it is assumed that a specific PDCCH is CRC-masked with a Radio Network Temporary Identity (RNTI) "A" and information about data, that is transmitted using radio resources "B" (e.g., frequency location) and transport format information "C" (e.g., transmission block size, modulation scheme, coding information, etc.), is transmitted through a specific subframe. In this case, a UE located in a cell monitors the PDCCH using its own RNTI information. If one or more UEs having the RNTI 'A' are present, the UEs receive the PDCCH and receive the PDSCH indicated by 'B' and 'C' through the received PDCCH information.

Figure 6:
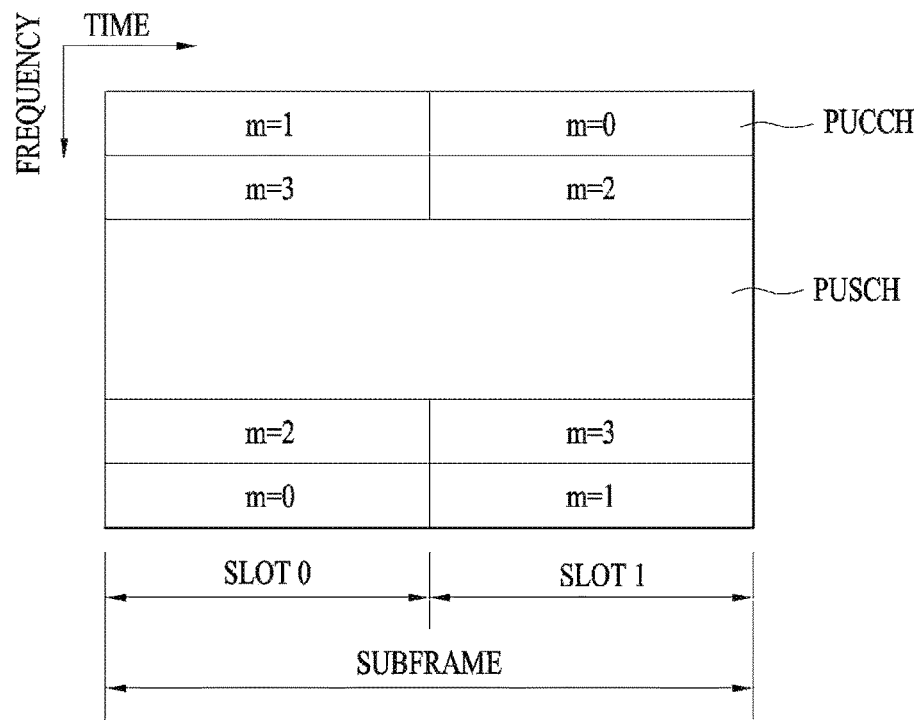
FIG. 6 illustrates the structure of an uplink subframe used in the LTE system.

FIG. 6 illustrates the structure of an uplink subframe used in the LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a CQI representing a downlink channel state, an RI for Multiple Input and Multiple Output (MIMO), a Scheduling Request (SR) indicating a request for allocation of uplink resources, etc. A PUCCH of a UE occupies one RB in a different frequency in each slot of a subframe. That is, two RBs allocated to the PUCCH frequency-hop over the slot boundary. Particularly, FIG. 6 illustrates an example in which PUCCHs for m=0, m=1, m=2, and m=3 are allocated to a subframe.

Hereinafter, a MIMO system will be described. MIMO refers to a method of using multiple transmission antennas and multiple reception antennas to improve data transmission/reception efficiency. Namely, a plurality of antennas is used at a transmitting end or a receiving end of a wireless communication system so that capacity can be increased and performance can be improved. MIMO may also be referred to as 'multi-antenna' in this disclosure.

MIMO technology does not depend on a single antenna path in order to receive a whole message. Instead, MIMO technology collects data fragments received via several antennas, merges the data fragments, and forms complete data. The use of MIMO technology can increase system coverage while improving data transfer rate within a cell area of a specific size or guaranteeing a specific data transfer rate. MIMO technology can be widely used in mobile communication terminals and relay nodes. MIMO technology can overcome the limitations of the restricted amount of transmission data of single antenna based mobile communication systems.

Figure 7:
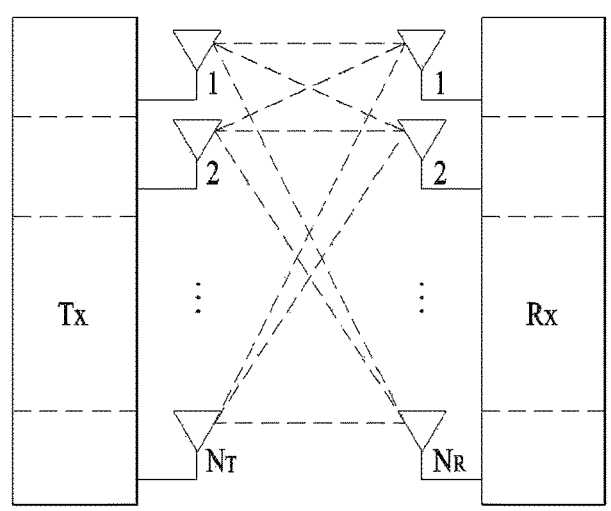
FIG. 7 illustrates the configuration of a general MIMO communication system.

The configuration of a general MIMO communication system is shown in FIG. 7.

A transmitting end is equipped with $N_T$ transmission (Tx) antennas and a receiving end is equipped with $N_R$ reception (Rx) antennas. If a plurality of antennas is used both at the transmitting end and at the receiving end, theoretical channel transmission capacity increases unlike the case where only either the transmitting end or the receiving end uses a plurality of antennas. Increase in channel transmission capacity is proportional to the number of antennas, thereby improving transfer rate and frequency efficiency. If a maximum transfer rate using a signal antenna is $R_o$, a transfer rate using multiple antennas can be theoretically increased by the product of the maximum transfer rate $R_o$ by a rate increment $R_i$. The rate increment $R_i$ is represented by the following equation 1 where $R_i$ is the smaller of $N_T$ and $N_R$.

$$R_i = \min(N_T, N_R) \qquad \text{[Equation 1]}$$

For example, in a MIMO communication system using four Tx antennas and four Rx antennas, it is possible to theoretically acquire a transfer rate four times that of a single antenna system. After theoretical increase in the capacity of the MIMO system was first demonstrated in the mid-1990s, various techniques for substantially improving data transfer rate have been under development. Several of these techniques have already been incorporated into a variety of wireless communication standards including, for example, 3rd generation mobile communication and next-generation wireless local area networks.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transfer rate.

To describe a communication method in a MIMO system in detail, a mathematical model thereof is given below. As shown in FIG. 7, it is assumed that $N_T$ Tx antennas and $N_R$ Rx antennas are present. In the case of a transmission signal, a maximum number of transmittable pieces of information is $N_T$ under the condition that $N_T$ Tx antennas are used, so that transmission information can be represented by a vector represented by the following equation 2:

$$s = [s_1, s_2, \ldots, s_{N_T}]^T \qquad \text{[Equation 2]}$$

Meanwhile, individual transmission information pieces $s_1, s_2, \ldots, s_{N_T}$ may have different transmission powers. In this case, if the individual transmission powers are denoted by $P_1, P_2, \ldots, P_{N_T}$, transmission information having adjusted transmission powers can be represented by a vector shown in the following equation 3:

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

The transmission power-controlled transmission information vector ŝ may be expressed as follows, using a diagonal matrix P of a transmission power:

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ to be actually transmitted may be configured by multiplying the transmission power-controlled information vector $\hat{s}$ by a weight matrix W. In this case, the weight matrix is adapted to properly distribute transmission information to individual antennas according to transmission channel situations. The transmission signals $x_1, x_2, \ldots, x_{N_T}$ can be represented by the following Equation 5 using a vector X. In Equation 5, $W_{ij}$ is a weight between the i-th Tx antenna and the j-th information and W is a weight matrix, which may also be referred to as a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

Generally, the physical meaning of a rank of a channel matrix may be a maximum number of different pieces of information that can be transmitted in a given channel. Accordingly, since the rank of the channel matrix is defined as the smaller of the number of rows or columns, which are independent of each other, the rank of the matrix is not greater than the number of rows or columns A rank of a channel matrix H, rank(H), is restricted as follows.

$$\text{rank}(H) \leq \min(N_T, N_R) \quad \text{[Equation 6]}$$

Each unit of different information transmitted using MIMO technology is defined as a 'transmission stream' or simply 'stream'. The 'stream' may be referred to as a 'layer'. The number of transmission streams is not greater than a rank of a channel which is a maximum number of different pieces of transmittable information. Accordingly, the channel matrix H may be indicted by the following Equation 7:

$$\text{\# of streams} \leq \text{rank}(H) \leq \min(N_T, N_R) \quad \text{[Equation 7]}$$

where '# of streams' denotes the number of streams. It should be noted that one stream may be transmitted through one or more antennas.

There may be various methods of allowing one or more streams to correspond to multiple antennas. These methods may be described as follows according to types of MIMO technology. The case where one stream is transmitted via multiple antennas may be called spatial diversity, and the case where multiple streams are transmitted via multiple antennas may be called spatial multiplexing. It is also possible to configure a hybrid of spatial diversity and spatial multiplexing.

Now, a description of a Channel status information (CSI) report is given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI to obtain a multiplexing gain of MIMO antennas. To obtain CSI from the UE, the eNB allocates a PUCCH or a PUSCH to command the UE to feedback CSI for a downlink signal.

CSI is divided into three types of information: a Rank Indicator (RI), a Precoding Matrix Index (PMI), and a Channel Quality Indicator (CQI). First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of Signal-to-Interference plus Noise Ratio (SINR). Lastly, CQI is information indicating the strength of a channel and indicates a reception SINR obtainable when the eNB uses PMI.

In an evolved communication system such as an LTE-A system, multi-user diversity using Multi-User MIMO (MU-MIMO) is additionally obtained. Since interference between UEs multiplexed in an antenna domain exists in the MU-MIMO scheme, CSI accuracy may greatly affect not only interference of a UE that has reported CSI but also interference of other multiplexed UEs. Hence, in order to correctly perform MU-MIMO operation, it is necessary to report CSI having accuracy higher than that of a Single User-MIMO (SU-MIMO) scheme.

Accordingly, LTE-A standard has determined that a final PMI should be separately designed into W1, which a long-term and/or wideband PMI, and W2, which is a short-term and/or subband PMI.

An example of a hierarchical codebook transform scheme configuring one final PMI from among W1 and W2 may use a long-term covariance matrix of a channel as indicated in Equation 8:

$$W = \text{norm}(W1\,W2) \quad \text{[Equation 8]}$$

In Equation 8, W2 of a short-term PMI indicates a codeword of a codebook configured to reflect short-term channel information, W denotes a codeword of a final codebook, and norm(A) indicates a matrix in which a norm of each column of a matrix A is normalized to 1.

The detailed configurations of W1 and W2 are shown in Equation 9:

$$W1(i) = \begin{bmatrix} X_i & 0 \\ 0 & X_i \end{bmatrix}, \text{where } X_i \text{ is } Nt/2 \text{ by } M \text{ matrix.} \quad \text{[Equation 9]}$$

$$W2(j) = \begin{bmatrix} \overbrace{e_M^k \quad e_M^l \quad e_M^m}^{r \text{ columns}} \\ \cdots \\ \alpha_j e_M^k \quad \beta_j e_M^l \quad \gamma_j e_M^m \end{bmatrix} \text{ (if rank} = r),$$

where $1 \leq k, l, m \leq M$ and $k, l, m$ are integer.

where Nt is the number of Tx antennas, M is the number of columns of a matrix Xi, indicating that the matrix Xi includes a total of M candidate column vectors. $e_M^k$, $e_M^l$, and $e_M^m$ denote k-th, l-th, and m-th column vectors of the matrix Xi in which only k-th, l-th, and m-th elements among M elements are 0 and the other elements are 0, respectively. $\alpha_j, \beta_j,$ and $\gamma_j$ are complex values each having a unit norm and indicate that, when the k-th, l-th, and m-th column vectors of the matrix Xi are selected, phase rotation is applied to the column vectors. At this time, i is an integer greater than 0, denoting a PMI index indicating W1 and j is an integer greater than 0, denoting a PMI index indicating W2.

In Equation 9, the codebook configurations are designed to reflect channel correlation properties generated when cross polarized antennas are used and when a space between antennas is dense, for example, when a distance between adjacent antennas is less than a half of signal wavelength. The cross polarized antennas may be categorized into a horizontal antenna group and a vertical antenna group. Each antenna group has the characteristic of a Uniform Linear Array (ULA) antenna and the two groups are co-located.

Accordingly, a correlation between antennas of each group has characteristics of the same linear phase increment and a correlation between antenna groups has characteristics of phase rotation. Consequently, since a codebook is a value obtained by quantizing a channel, it is necessary to design a codebook such that characteristics of a channel are reflected. For convenience of description, a rank-1 codeword generated by the aforementioned configurations is shown as follows:

$$W1(i) * W2(j) = \begin{bmatrix} X_i(k) \\ \alpha_j X_i(k) \end{bmatrix}$$ [Equation 10]

In Equation 10, a codeword is expressed as a vector of $N_T \times 1$ (where NT is the number of Tx antennas) and is structured with an upper vector $X_i(k)$ and a lower vector $\alpha_j X_i(k)$ which show correlation characteristics of a horizontal antenna group and a vertical antenna group, respectively. $X_i(k)$ is preferably expressed as a vector having the characteristics of linear phase increment by reflecting the characteristics of a correlation between antennas of each antenna group and may be a DFT matrix as a representative example.

As described above, CSI in the LTE system includes, but is not limited to, CQI, PMI, and RI. According to transmission mode of each UE, all or some of the CQI, PMI, and RI is transmitted. Periodic transmission of CSI is referred to as periodic reporting and transmission of CSI at the request of an eNB is referred to as aperiodic reporting.

In aperiodic reporting, a request bit included in uplink scheduling information transmitted by the eNB is transmitted to the UE. Then, the UE transmits CSI considering transmission mode thereof to the eNB through an uplink data channel (PUSCH).

In periodic reporting, a period of CSI and an offset at the period are signaled in the unit of subframes by a semi-static scheme through a higher-layer signal per UE. The UE transmits CSI considering transmission mode to the eNB through an uplink control channel (PUCCH). If there is uplink data in a subframe in which CSI is transmitted, the CSI is transmitted through an uplink data channel (PUSCH) together with the uplink data.

The eNB transmits transmission timing information suitable for each UE to the UE in consideration of a channel state of each UE and a UE distributed situation in a cell. The transmission timing information includes a period and an offset necessary for transmitting CSI and may be transmitted to each UE through an RRC message.

Hereinafter, Cooperative Multipoint (CoMP) transmission/reception will be described.

In a system after LTE-A, a scheme for raising system performance by enabling cooperation between a plurality of cells is attempted. Such a scheme is called CoMP transmission/reception. CoMP refers to a scheme in which two or more eNBs, access points, or cells cooperatively communicate with a UE for smooth communication between a specific UE and an eNB, an access point, or a cell. In the present invention, eNB, access point, and cell may be used interchangeably.

In general, in a multi-cell environment in which a frequency reuse factor is 1, the performance of the UE located at a cell edge and average sector throughput may be reduced due to Inter-Cell Interference (ICI). In order to reduce ICI, a legacy LTE system uses a method of enabling the UE located at a cell edge to have appropriate throughput and performance using a simple passive scheme such as Fractional Frequency Reuse (FFR) through UE-specific power control in an environment restricted by interference. However, it is desirable that ICI be reduced or the UE reuse ICI as a desired signal, rather than decreasing the use of frequency resources per cell. In order to accomplish the above purpose, a CoMP transmission scheme may be employed.

Figure 8:
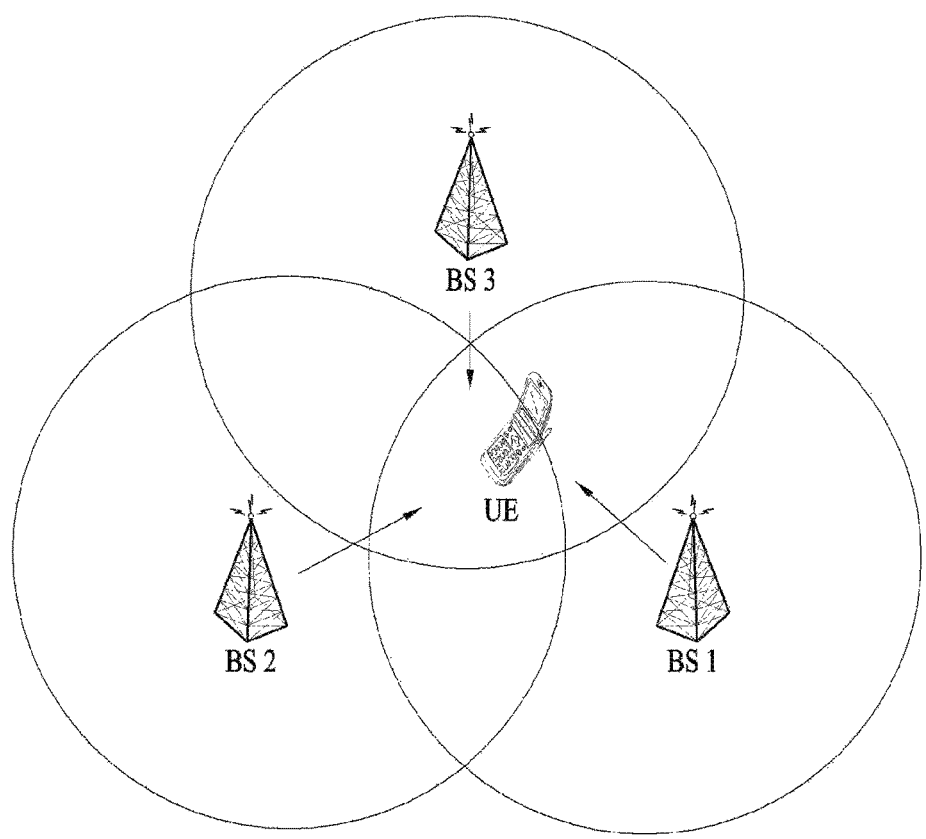
FIG. 8 illustrates an example of performing CoMP.

FIG. 8 illustrates an example of performing CoMP. Referring to FIG. 8, a radio communication system includes a plurality of eNBs eNB1, eNB2, and eNB3 that perform CoMP and a UE. The plural eNBs eNB1, eNB2, and eNB3 for performing CoMP may efficiently transmit data to the UE through cooperation.

A CoMP transmission scheme may be divided into CoMP-Joint Processing (CoMP-JP) which is a cooperative MIMO type of JP through data sharing and CoMP-Coordinated Scheduling/Coordinated Beamforming (CoMP-CS/CB).

In the case a CoMP-JP scheme in downlink, a UE may simultaneously receive data from a plurality of eNB implementing the CoMP transmission scheme and may improve reception performance by combining signals received from the respective eNBs (Joint Transmission (JT)). In addition, a method in which one of a plurality of eNBs performing the CoMP transmission scheme transmits data to the UE at a specific time point may be considered (Dynamic Point Selection (DPS). In a CoMP-CS/CB scheme in downlink, the UE may instantaneously receive data through one eNB, i.e. a serving eNB by beamforming.

If the CoMP-JP scheme is applied in uplink, a plurality of eNBs may simultaneously receive a PUSCH signal from the UE (Joint Reception (JR)). In the case of CoMP-CS/CB in uplink, only one eNB may receive a PUSCH signal. Cooperative cells (or eNBs) may determine to use the CoMP-CS/CB scheme.

A UE using the CoMP transmission scheme, i.e. a CoMP UE, may feed back channel information feedback (hereinafter, CSI feedback) to a plurality of eNBs performing the CoMP transmission scheme. A network scheduler may select a proper CoMP transmission scheme capable of raising a transmission rate among the CoMP-JP, CoMP-CS/CB, and DPS schemes based on CSI feedback. To this end, a periodic feedback transmission scheme using a PUCCH may be used as a method in which the UE configures CSI feedback in a plurality of eNBs performing the CoMP transmission scheme. In this case, feedback configurations for the eNBs may be independent of one another. Accordingly, in the disclosure according to an embodiment of the present invention, an operation of feeding back CSI with such an independent feedback configuration is referred to as a CSI process. One or more CSI processes may be performed in one serving cell.

Figure 9:
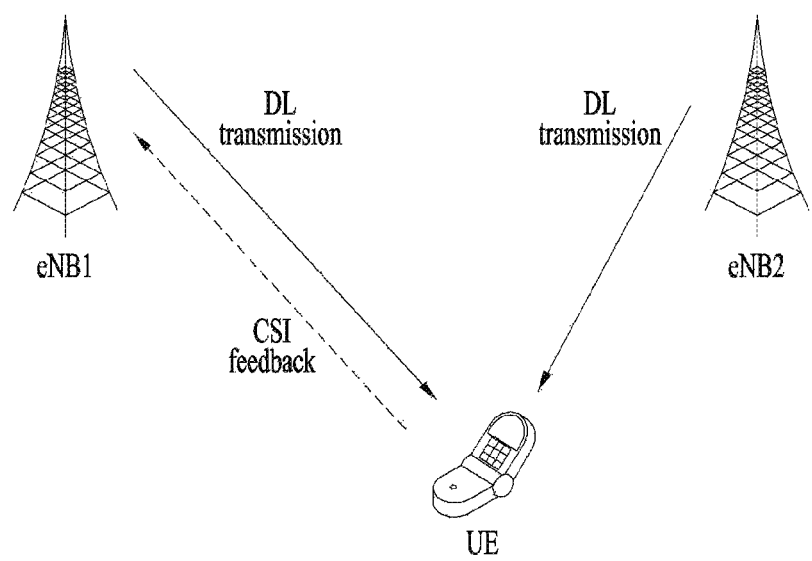
FIG. 9 illustrates a downlink CoMP operation.

FIG. 9 illustrates a downlink CoMP operation.

In FIG. 9, a UE is positioned between an eNB1 and an eNB2 and the two eNBs, i.e. eNB1 and eNB2, perform a proper CoMP operation such as JT, DCS, or CS/CB to solve a problem of interference to the UE. To aid in the CoMP operation of the eNBs, the UE performs proper CSI feedback. Information transmitted through CSI feedback includes PMI and CQI of each eNB and may additionally include channel information between the two eNBs (e.g. phase offset information between two eNB channels) for JT.

In FIG. 9, although the UE transmits a CSI feedback signal to the eNB1 which is a serving cell thereof, the UE may transmit the CSI feedback signal to the eNB2 or the two eNBs, according to situation. In addition, in FIG. 16, while the eNBs are described as a basic unit participating in CoMP, the present invention may be applied to CoMP between Transmission Points (TPs) controlled by a single eNB.

That is, for CoMP scheduling in a network, the UE should feed back not only downlink CSI of a serving eNB/TP but also downlink CSI of a neighboring eNB/TP. To this end, the UE feeds back a plurality of CSI processes reflecting various interference environments of eNBs/TPs for data transmission.

Accordingly, an Interference Measurement Resource (IMR) is used to measure interference during CoMP CSI calculation in an LTE system. A plurality of IMRs may be configured for one UE and each of the plural IMRs may be independently configured. That is, the period, offset, and resource configuration of the IMR are independently determined and may be signaled by an eNB to a UE using higher layer signaling (RRC etc.).

In addition, a CSI-RS is used to measure a channel desired for CoMP CSI calculation in the LTE system. A plurality of CSI-RSs may be configured for one UE and each of the CSI-RSs in independently configured. Namely, each CSI-RS includes an independently configured period, offset, resource configuration, power control, and the number of antenna ports and information related to the CSI-RS is signaled to the UE from the eNB through higher layer signaling (RRC etc.).

Among a plurality of CSI-RSs and a plurality of IMRs configured for a UE, one CSI process may be defined in association with one CSI-RS resource for signal measurement and one IMR for interference measurement. The UE feeds back CSI having different periods and subframe offsets, derived from different CSI processes, to a network (e.g. eNB).

That is, each CSI process has an independent CSI feedback configuration. The eNB may signal the CSI-RS resource, IMR association information, and CSI feedback configuration to the UE through higher layer signaling of RRC etc. on a CSI process basis. For example, it is assumed that three CSI processes as shown in Table 1 are configured for the UE.

TABLE 1

| CSI Process | Signal Measurement Resource (SMR) | IMR |
|---|---|---|
| CSI process 0 | CSI-RS 0 | IMR 0 |
| CSI process 1 | CSI-RS 1 | IMR 1 |
| CSI process 2 | CSI-RS 0 | IMR 2 |

In Table 1, CSI-RS 0 and CSI-RS 1 indicate a CSI-RS received from an eNB 1 which is a serving eNB of the UE and a CSI-RS received from an eNB 2 which is a neighboring eNB participating in cooperation. It is assumed that IMRs configured for the CSI processes of Table 1 are configured as shown in Table 2.

TABLE 2

| IMR | eNB 1 | eNB 2 |
|---|---|---|
| IMR 0 | Muting | Data transmission |
| IMR 1 | Data transmission | Muting |
| IMR 2 | Muting | Muting |

In IMR 0, the eNB 1 performs muting, the eNB 2 performs data transmission, and the UE is configured to measure interference of eNBs except for the eNB 1 from IMR 0. Similarly, in IMR 1, the eNB 2 performs muting, the eNB 1 performs data transmission, and the UE is configured to measure interference of eNBs except for the eNB 2 from IMR 1. In addition, in IMR 2, both the eNB 1 and eNB2 perform muting and the UE is configured to measure interference of eNBs except for the eNB1 and eNB 2 from IMR 2.

Accordingly, as shown in Table 1 and Table 2, CSI of CSI process 0 indicates optimal RI, PMI, and CQI when data is received from the eNB 1. CSI of CSI process 1 indicates optimal RI, PMI, and CQI when data is received from the eNB 2. CSI of CSI process 2 indicates optimal RI, PMI, and CQI, when data is received from the eNB 1 and there is no interference from the eNB 2.

Research has currently been actively conducted on introduction of an active antenna system (AAS) in next generation mobile communication. The AAS is a technology that can be more efficiently applied to perform beamforming or reduce interference by changing an antenna pattern according to circumstance.

When the AAS is configured as a two-dimensional AAS (2D-AAS), it is possible to more actively change a transmission beam according to a position of a receiving end by more efficiently and three-dimensionally adjusting a main lobe of an antenna in terms of antenna pattern.

Figure 10:
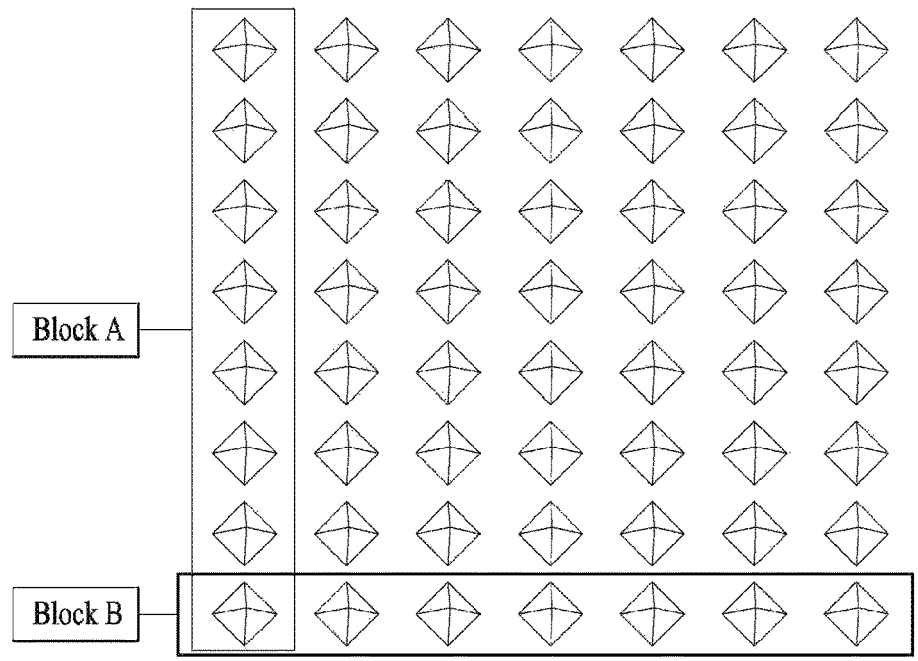
FIG. 10 illustrates an example of implementation of the 2D-AAS.

FIG. 10 illustrates an example of implementation of the 2D-AAS. In particular, FIG. 10 presumes a co-polarized antenna array in which each antenna element has the same polarization.

Referring to FIG. 10, the 2D-AAS is expected to be constructed as a system having a plurality of antennas by installing antennas in a vertical direction and a horizontal direction.

Meanwhile, it is possible to consider a cross-polarized antenna array (X-pol AA) instead of the co-polarized antenna array illustrated in FIG. 10.

Figure 11:
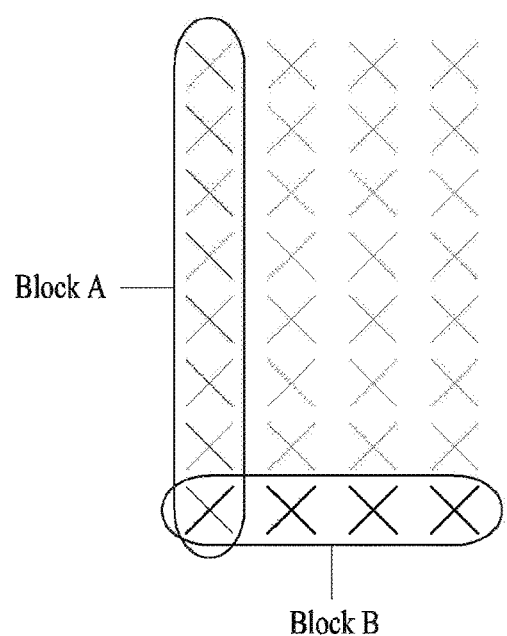
FIG. 11 is an example of implementation of the cross-polarized antenna array having 64 antenna elements.

FIG. 11 is an example of implementation of the cross-polarized antenna array having 64 antenna elements. Similar to FIG. 10, it can be understood that Group A and Group B are configured for respective antenna arrays in the vertical direction and the horizontal direction.

If the 2D-AAS is introduced, a transmitting end needs to transmit a specific RS (e.g., CSI-RS) to a receiving end in order to provide the receiving end with information about channels from the transmitting end to the receiving end. In the current LTE system, the CSI-RS is designed as a 1-port, 2-port, 4-port, or 8-port CSI-RS. This is generalized to use of n REs for each n-port CSI-RS (n>1) in one RB.

In the 2D-AAS case illustrated in FIG. 10, there are eight antennas in a vertical direction and eight antennas in a horizontal direction. Thus, a total of 64 antennas are arranged. Then, conventionally 64 REs should be used to carry CSI-RSs in one RB. As a result, CSI-RS overhead based on the number of antennas may be problematic.

To avert the problem, it has recently been discussed that only a part of CSI-RS ports is configured for a UE and the UE feeds back CSI using the partial CSI-RS ports. One of such schemes, Beamformed CSI-RS (BF CSI-RS)-based CSI feedback will be described.

An eNB configures BF CSI-RS ports to all of which the same vertical beam is applied, for a UE. The vertical beam is controlled to a specific vertical tilting angle as a target angle, and BF CSI-RSs may be generated simply by multiplying a transmission signal by a Discrete Fourier Transform (DFT) vector.

For example, one BF CSI-RS port may be generated through block A illustrated in FIG. 11. Block A is an 8×1 vertical antenna array having the same polarization property, and a vertical beam may be generated at a specific vertical tilting angle by multiplying block A by an 8×1 DFT vector. In this manner, the remaining seven blocks each being an 8×1 vertical antenna array with the same polarization property may be produced in FIG. 11. Seven BF CSI-RS ports may be generated by applying the same DFT vector as used for block A to the remaining seven blocks.

An 8-port BF CSI-RS generated in the above manner is configured for a UE, and the UE generates CSI using the CSI-RS. Because vertical beamforming has already been applied to the CSI-RS, the CSI generated by the UE means an optimal horizontal RI and PMI obtained on the assumption that the specific vertical beam has been used, and a CQI obtained for the case where the specific vertical beam and the optimal horizontal RI and PMI are used.

While one 8-port BF CSI-RS has been configured for a UE in the above example, this may be extended to configuring another 8-port BF CSI-RS to which another vertical beam is applied. For example, 8-port BF CSI-RS #1 to which vertical beam #1 is applied and 8-port BF CSI-RS #2 to which vertical beam #2 is applied are configured for the UE. Although the UE may calculate and report independent CSI for each BF CSI-RS, it is preferred that the UE calculates CSI on the assumption that the eNB transmits data using all BF CSI-RS channels simultaneously. Accordingly, when a PMI and an RI are determined for one BF CSI-RS, the PMI and the RI are preferably determined in consideration of a PMI and an RI calculated for the latest determined remaining BF CSI-RS. Preferably, a CQI is also calculated on the assumption that the eNB transmits data on all BF CSI-RS channels using the reported PMI and RI.

In summary, an N-Tx CSI-RS and an N-Tx PMI should be defined newly for CSI feedback in a massive MIMO environment in which an eNB has many transmission antennas. However, considering RS overhead or feedback overhead, it may be difficult to newly define the N-Tx CSI-RS and N-Tx PMI. In this context, a method for supporting massive MIMO feedback using a legacy M-Tx CSI-RS and M-Tx PMI (M is equal to or smaller than 8) is under discussion, and one of the following three feedback mechanisms may be used.

A CSI process defined in the current 3GPP TS 36.331 document is given as follows.

TABLE 3

```
-- ASN1START
CSI-Process-r11 ::=   SEQUENCE {
    csi-ProcessId-r11            CSI-Process Id-r11,
    csi-RS-ConfigNZPId-r11       CSI-RS-ConfigN2PId-r11,
    csi-IM-ConfigId-r11          CSI-IM-ConfigId-r11,
    p-C-AndCBSRList-r11 SEQUENCE (SIZE (1..2)) OF P-C-AndCBSR-r11,
    cqi-ReportBothProc-r11       CQI-ReportBothProc-r11       OPTIONAL,        -- Need OR
    cqi-ReportPeriodicProcId-r11     INTEGER (0..maxCQI-ProcExt-r11)  OPTIONAL,   -- Need OR
    cqi-ReportAperiodicProc-r11  CQI-ReportAperiodicProc-r11  OPTIONAL,        -- Need OR
    ...,
    [[  alternativeCodebookEnabledFor4TXProc-r12  ENUMERATED (true)  OPTIONAL,   -- Need OR
        csi-IM-ConfigIdList-r12        SEQUENCE (SIZE (1..2)) OF CSI-IM-ConfigId-r12  OPTIONAL,
    -- Cond CSIIMREL12
        cqi-ReportAperiodicProcSecond-r12  CQI-ReportAperiodicProc-r11   OPTIONAL       -- Need OR
    ]]
}
P-C-AndCBSR-r11 ::= SEQUENCE {
    p-C-r11                      INTEGER (-8..15),
    codebookSubsetRestriction-r11    BIT STRING
}
-- ASN1STOP
```

A. Supporting Massive MIMO Feedback in Multiple CSI Processes

First of all, a method for supporting massive MIMO feedback in multi-PUCCH feedback chain-based multiple CSI processes will be described. Herein, a feedback chain refers to preliminarily reserved PUCCH resources for CSI reporting with a specific period and offset.

Specifically, a BF CSI-RS to which different vertical beamforming is applied is configured for each of multiple CSI processes, and a UE feeds back CSI through a PUCCH feedback chain configured for each CSI process. For example, CSI process #1 and CSI process #2 are configured for one UE, 8-port BF CSI-RS #1 to which vertical beam #1 is applied is configured in CSI process #1, and 8-port BF CSI-RS #2 to which vertical beam #2 is applied is configured in CSI process #2.

Each of the CSI processes shows only a part of massive MIMO channels. If the UE calculates CSI on the assumption of independent channels of the CSI processes as is done conventionally, the CSI may not be optimal from the viewpoint of the total channels. For example, although the UE calculates CSI 1 for CSI process #1 and CSI 2 for CSI process #2 by treating CSI process #1 and CSI process #2 independently, if the eNB transmits data to the UE using vertical beam #1 and vertical beam #2 simultaneously, CSI 1 and CSI 2 do not provide optimal CSI for the data transmission. Accordingly, to enable the UE to calculate optimal CSI, the eNB should indicate to the UE that each of CSI process #1 and CSI process #2 shows only a part of massive MIMO channels and how the partial channels form the massive MIMO channels.

For this purpose, a CSI process group including a plurality of CSI processes may be configured for the UE. For example, RRC signaling may be configured as illustrated in [Table 4] below.

TABLE 4

```
CSI-PROCESS-group-r13 ::=      SEQUENCE {
    CSI-Process-groupId-r13           CSI-Process-groupId-r13,
    csi-Process-composite-pattern-r13  INTEGER (0..maxpattern-r13)
    csi-ProcessId1-r11                CSI-ProcessId-r11,
    csi-ProcessId2-r11                CSI-ProcessId-r11, ...,
    csi-ProcessIdn-r11                CSI-ProcessId-r11,
}
```

The UE assumes that each of the plurality of CSI processes defined in the CSI process group shows only a part of the massive MIMO channels, and information indicating how the partial channels form the massive MIMO channels is indicated by csi-Process-composite-pattern-r13 depicted in [Table 4].

Or the eNB and the UE assume a fixed pattern for forming the massive MIMO channels with the partial channels, without signaling. That is, the UE calculates CSI for each CSI process in a different manner according to csi-Process-composite-pattern-r13.

For example, pattern #1 is that a CSI-RS of each CSI process is a BF CSI-RS to which a different vertical beam is applied. Specifically, if CSI process #1 and CSI process #2 belong to the same CSI process group and pattern #1 is configured for CSI process #1 and CSI process #2, the UE assumes that CSI-RS #1 and CSI-RS #2 have been beamformed with vertical beam #1 and vertical beam #2, respectively.

In this case, the UE calculates CSI in a different manner according to a pattern. For example, after estimating Nr×8 channels, H1 with BF CSI-RS #1 and Nr×8 channels, H2 with BF CSI-RS #2, the UE calculates achievable CQIc by changing PMI21 and PMI22 in [Equation 11]. In [Equation 11], x represents a data signal, and n represents the sum of an interference signal and noise.

$$y = [\, H_1 \;\; H_2 \,] \times \begin{bmatrix} PMI_{21} & 0 \\ 0 & PMI_{22} \end{bmatrix} \times x + n \qquad \text{[Equation 11]}$$

Meanwhile, for pattern #2, the eNB and the UE may agree that a CSI-RS of each CSI process in the CSI process group is mapped to a specific block in antenna ports of the eNB. That is, in FIG. 10, the UE assumes that the CSI-RS #1 and CSI-RS #2 are mapped to different blocks in antenna ports of the BS, when calculating CSI. For example, the eNB and the UE agree that CSI-RS #1 indicates channels corresponding to block A illustrated in FIG. 10 and CSI-RS #2 indicates channels corresponding to block B illustrated in FIG. 10.

Similarly, the UE calculates CSI in a different manner according to a pattern. In this case, the UE calculates CQIc achievable on the assumption that the eNB generates a precoder by a Kronecker product between P21 for channels of CSI-RS #1 and P22 for the channels of CSI-RS #1 (CSI-RS #2?).

For example, the eNB configures a CSI process group including CSI process #1 and CSI process #2 for the UE, and indicates to the UE by csi-Process-composite-pattern-r13 that CSI-RSs of CSI process #1 and CSI process #2 are BF CSI-RSs to which different directional beams are applied. The UE does not treat CSI process #1 and CSI process #2 independently any more.

That is, the UE determines an RI and a PMI for CSI process #1, assuming that the eNB transmits data simultaneously on channels of CSI process #2 using an RI and a PMI for CSI process #2. Likewise, the UE considers the RI and PMI for CSI process #1 in determining the RI and PMI for CSI process #2. The UE calculates a CQI achievable when the eNB transmits a part of data on the channels of CSI process #1 using the RI and PMI for CSI process #1 and the other part of the data on the channels of CSI process #2 using the RI and PMI for CSI process #2.

As noted from [Table 3], a CSI-Interference Measurement resource (CSI-IM) may be defined separately for each CSI process, and CSI for each CSI process is calculated, assuming interference using the CSI-IM defined for the CSI process.

B. Supporting Massive MIMO Feedback in Single CSI Process

Next, a method for supporting massive MIMO feedback in single-PUCCH feedback chain-based single CSI process will be described.

One CSI process is configured for a UE, and the UE configures a plurality of BF CSI-RSs by applying different vertical beams to the CSI process. As in a legacy CSI process, only one CSI-IM is configured and the same CSI-IM is used for calculation of CSI for each BF CSI-RS. The UE simultaneously feeds back CSI for the plurality of CSI-RSs through one PUCCH feedback chain configured for the CSI process.

For example, CSI process #1 is configured for the UE, and both 8-port BF CSI-RS #1 to which vertical beam #1 is applied and 8-port BF CSI-RS #2 to which vertical beam #2 is applied are configured in CSI process #1. That is, csi-RS-ConfigNZPId-r11 meaning 8-port BF CSI-RS #1 and csi-RS-ConfigNZPId-r11 meaning 8-port BF CSI-RS #2 are configured in the CSI process Information Element (IE) illustrated in [Table 3]. Because one PUCCH feedback chain is defined, cqi-ReportPeriodicProcId-r11 is defined as one value in the CSI process IE illustrated in [Table 3]. Although p-C-AndCBSRList-r11 may be applied commonly to the BF CSI-RSs configured in the CSI process, p-C-AndCBSRList-r11 may be defined for each BF CSI-RS, for more flexible operation.

The present invention proposes a method performed by a UE for performing CSI feedback to enable an eNB to determine a vertical beam to be applied to a CSI-RS.

As a first method for the vertical beam determination, it may be considered that an eNB receives feedback of CSI RSRP from a UE and then determines an optimal vertical beam for each UE. Specifically, the eNB informs the UE of N CSI-RSs to which different vertical beamforming is applied, and each UE feeds back N CSI reference signal received powers (RSRPs) using the N CSI-RSs. Thereafter, the eNB may determine the optimal vertical beam for each UE based on the CSI RSRPs and transmit a BF CSI-RS by applying the corresponding vertical beam. Here, the BF CSI-RS is configured for the UE as described in the method A (i.e., multiple CSI processes) or in the method B (i.e., single CSI process). Subsequently, the UE calculates and feeds back the CSI using the BF CSI-RS.

As a second method for the vertical beam determination, the eNB first informs the UE of the 8-port CSI-RS corresponding to the block A of FIG. 11. There is no vertical beam applied to this CSI-RS and it shows channels for vertical ULA antennas. The UE may feed back the CSI (e.g., a preferred vertical beam) using the CSI-RS. In addition, the eNB may determine the optimal vertical beam for each UE using the CSI feedback information and transmit the BF CSI-RS by applying the corresponding vertical beam. Similar to the first method, the BF CSI-RS is configured for the UE as described in the method A (i.e., multiple CSI processes) or in the method B (i.e., single CSI process). Subsequently, the UE calculates and feeds back the CSI using the BF CSI-RS.

When the first and second methods for the vertical beam determination are compared, it could be concluded that the amount of resources required for the second method is smaller than that required for the first method in that the N CSI-RSs are used to determine the vertical beam in the first method but the only one CSI-RS is used in the second method. However, to figure out the amount of the required resources more accurately, the first and second methods need to be divided into the following two cases and then analyzed.

First, if a cell has a number of served UEs like a macro cell, the N CSI-RSs in the first method are highly likely to be already used by UEs as BF CSI-RSs for CSI feedback regarding horizontal channels. Thus, since the N CSI-RSs are not considered as additional resource overhead, it is impossible to determine that the first method uses more resources. On the other hand, if a cell has few served UEs like a small cell, the N CSI-RSs in the first method is considered as the additional resource overhead, and thus, it is possible to determine that the first method uses more resources.

Regarding the second method for the vertical beam determination, the present invention proposes a method performed by an eNB for configuring a CSI-RS for the vertical beam determination for a UE and a method performed by the UE for feeding back CSI using the configured CSI-RS.

First, a description will be given of a CSI feedback process to which the present invention is applied. If a UE feeds back CSI for a vertical channel according to an embodiment of the present invention, an eNB determines a vertical beam based on the received CSI information. Thereafter, the eNB transmits a BF CSI-RS to the UE using the vertical beam. In this case, the UE calculates and feeds back CSI using the BF CSI-RS according to the aforementioned method A (i.e., multiple CSI processes) or method B (i.e., single CSI process).

Hereinafter, assume that an eNB has 64 Tx antennas as shown in FIG. 11 and the 8-port CSI-RS corresponding to the block A of FIG. 11 is configured for a UE. Before describing particular embodiments of the present invention, a case in which an eNB receives CSI feedback from a UE to determine a vertical beam according to the related art will be explained.

According to the related art, the eNB configures a new CSI process and informs the UE of the 8-port CSI-RS corresponding to the block A of FIG. 11 through the new CSI process. The UE performs periodic CSI feedback and aperiodic CSI feedback through the CSI process, and the eNB determines the vertical beam based on the CSI information.

Considering characteristics of a vertical channel, it is difficult to consider the aforementioned conventional method as an optimized method. Compared to a conventional horizontal channel, the vertical channel has few scatters between the eNB and UE. In addition, since a UE's moving speed is low in the vertical direction, channel characteristics are barely changed. Thus, it is preferred to aperiodically report channel information according to a request from the eNB rather than periodic channel information feedback. Considering the above-described features, it is desirable to operate the CSI feedback for the vertical beam determination only in an aperiodic manner.

However, considering that the number of CSI processes configured for a UE may be limited according to its processing capability, the conventional method in which additional CSI processes are required for configuring the vertical beam may cause a problem. For example, if a UE has a capability of controlling only a single CSI process, the conventional method may not operate. This is because since the single CSI process is already configured for the UE for the purpose of the vertical beam determination according to the conventional method, an additional CSI process for the BF CSI-RS cannot be configured.

As another example, if a UE has a capability of controlling two CSI processes, a CSI reference resource may be configured inefficiently. In this case, assume that the UE measures the CSI reference resource in subframe #(n-$n_{CQI\_ref}$) and feeds back CSI in subframe #n. If two CSI processes, i.e., the CSI process for the vertical beam and the CSI process in which the BF CSI-RS is configured are configured for the UE, a value of $n_{CQI\_ref}$ of the CSI reference resource of the FDD system is changed from 4 to 5. The reason for this is to secure more time for the calculation by changing the $N_{CQI\_ref}$ value to 5, considering that CSI calculation in two CSI processes is more complicated than that in a single CSI process. However, in this case, the CSI may become inaccurate due to channel aging caused by the increase in the calculation time. Therefore, considering that the CSI process for configuring the vertical beam is generally used for aperiodic feedback, the $n_{CQI\_ref}$ ref value of the CSI reference resource for periodic feedback does not need to be changed to 5, that is, it is preferred to maintain the $n_{CQI\_ref}$ value as 4. By doing so, it is possible to feedback more accurate CSI.

To solve these problems, the present invention proposes a method for additionally configuring one more aperiodic (AP) CSI-RS within the CSI process in which the BF CSI-RS is configured rather than configuring a new CSI process for configuring the vertical beam. Particularly, the CSI process where the AP CSI-RS is added is referred to as a mother CSI process.

When a UE performs periodic CSI feedback for the mother CSI process, the UE does not use the AP CSI-RS but uses remaining (BF) CSI-RSs to calculate and feed back the CSI. On the other hand, when the UE performs aperiodic CSI feedback, the UE uses the AP CSI-RS to calculate and feed back the CSI. That is, when the mother CSI process is triggered as the aperiodic CSI feedback through uplink DCI, the UE calculates and feeds back the CSI (i.e., AP CSI-RS based CSI) using an IMR and the AP CSI-RS in the mother CSI process. Additionally, the UE may also calculate and feed back the CSI (i.e., BF CSI-RS based CSI) using the IMR and the exiting CSI-RS in the mother CSI process.

In the case of the aperiodic CSI feedback, when both of the AP CSI-RS based CSI and (BF) CSI-RS based CSI in the mother CSI process are calculated and fed back, calculation complexity required for the mother CSI process is significantly higher than that required for a normal CSI process. Thus, when the mother CSI process is introduced in the aperiodic CSI feedback, a CSI reference resource configuration method defined in the current specification standard, i.e., a method for configuring the $n_{CQI\_ref}$ value based on the number of CSI processes may not be used to reduce UE's calculation complexity.

To solve this, a UE may be limited not to report both of the AP CSI-RS based CSI and (BF) CSI-RS based CSI in the mother CSI process at the same time in the aperiodic CSI feedback. In this case, the UE may select one of the AP CSI-RS based CSI and CSI-RS based CSI to be reported and then inform the eNB of the CSI to be reported. Alternatively, the eNB may indicate the CSI to be reported through DCI. Likewise, when a plurality of BF CSI-RSs are defined for a single CSI process, a UE may be limited to report CSI for a single CSI-RS only in the aperiodic CSI feedback.

As another solution, when the mother CSI process is configured for a UE and the UE performs the aperiodic CSI feedback, the UE may determine $n_{CQI\_ref}$ by counting the number of CSI processes in the mother CSI process as many as the number of CSI-RSs defined by the mother CSI process. For example, when a single AP CSI-RS and a single BF CSI-RS are defined in the mother CSI process and a different CSI process in which a single BF CSI-RS is defined is configured for the UE, the UE may assume that a total of three CSI processes are configured by counting the number of CSI processes in the mother CSI process as 2 and the different CSI process as 1 and then determine $n_{CQI\_ref}$. Likewise, when n BF CSI-RSs are defined in a single CSI process, the UE may consider the number of total CSI processes as n and then determine $n_{CQI\_ref}$ based on n.

For example, when K BF CSI-RSs are configured as K CSI processes, one of the K CSI processes may be configured as the mother process and the AP CSI-RS may be added to the mother process. The eNB may select the mother CSI process from among the K CSI processes and inform the UE of the selected mother CSI process. Alternatively, the mother CSI process may be determined without signaling in a prescribed manner, for example, using the lowest minimum CSI process index. Further, when K BF CSI-RSs are configured as a single CSI process, the CSI process may be configured as the mother CSI process and then, the AP CSI-RS may be additionally configured therein.

Figure 12:
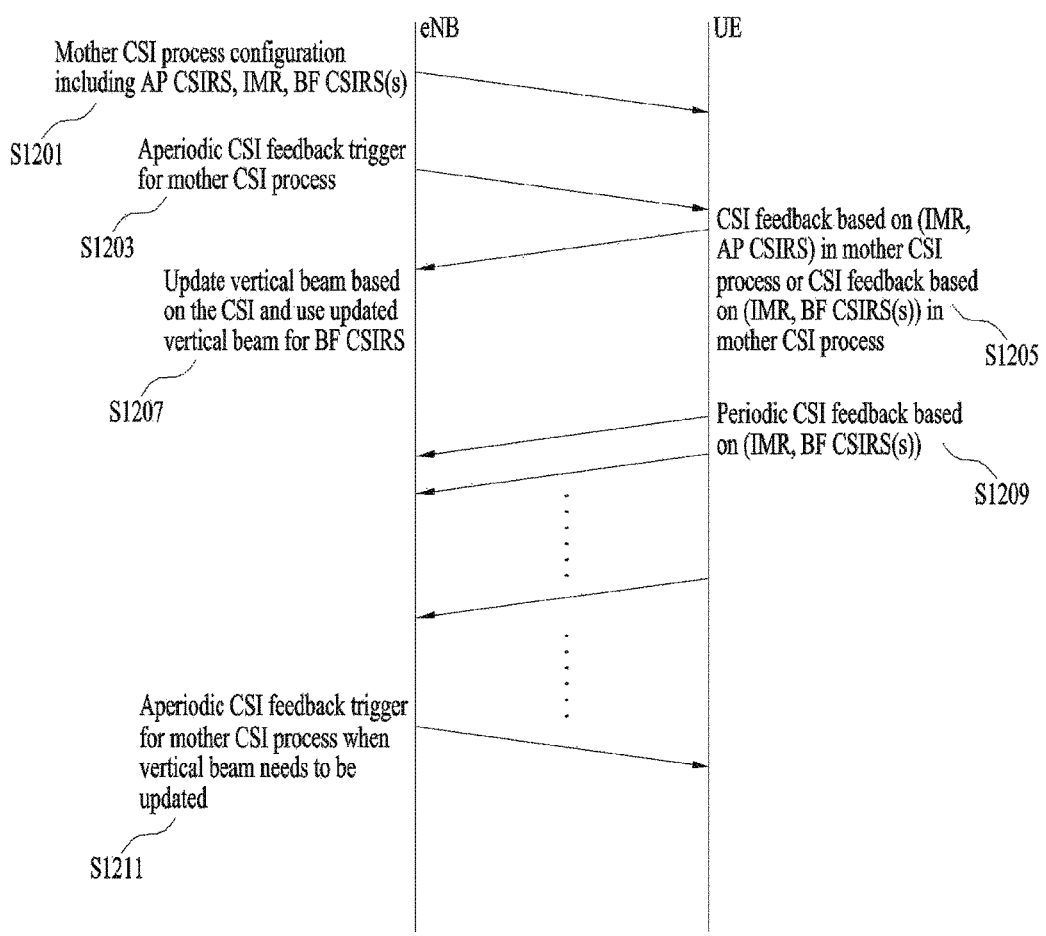
FIG. 12 illustrates an example of performing CSI feedback according to an embodiment of the present invention.

FIG. 12 illustrates an example of performing CSI feedback according to an embodiment of the present invention.

Referring to FIG. 12, an eNB configures a mother CSI process for a UE in the step 1201. Preferably, the mother CSI process may include an AP CSI-RS, an IMR, and at least one BF CSI-RS. Thereafter, the eNB triggers aperiodic CSI feedback for the mother CSI process in the step 1203. In other words, the eNB transmits, to the UE, a triggering message for the aperiodic CSI feedback.

After receiving the triggering message, the UE calculates and feeds back CSI using the IMR and AP CSI-RS defined in the mother CSI process in the step 1205. Additionally, the UE may calculate CSI using the IMR and BF CSI-RS defined in the mother CSI and then feed back the calculated CSI together in the step 1205.

In the step 1207, the eNB updates a vertical beam based on the received CSI. Although not shown in the drawing, the eNB transmits the BF CSI-RS by applying the updated vertical beam. Subsequently, the UE calculates CSI using the IMR and BF CSI-RS and then periodically feeds back the CSI in the step S1209.

Thereafter, when the eNB needs to update the vertical beam, the eNB triggers the UE to perform the aperiodic CSI feedback for the mother CSI process again as shown in the step 1211.

Unlike this embodiment, instead of introducing the mother CSI process, an additional CSI process for the AP CSI-RS configuration may be configured as in the related art but a method for reporting UE capability may be modified for operation.

Specifically, when a UE reports UE capability to a network, the UE may separately report the number N1 of additional CSI processes in which the AP CSI-RS can be configured (i.e., CSI processes dedicated to the AP CSI-RS) and the number N2 of CSI processes in which the AP CSI-RS cannot be configured (i.e., CSI processes non-dedicated to the AP CSI-RS). In addition, the UE may change a method for calculating and reporting aperiodic CSI according to a combination of N1 and N2. Here, the CSI process non-dedicated to the AP CSI-RS may imply a CSI process in which not only the AP CSI-RS but also the BF CSI-RS can be configured similar to the mother CSI process.

For example, in the case of periodic CSI reporting, the $n_{CQI\_ref}$ value of a CSI reference resource does not relate to N1 but is determined based on N2 only. On the contrary, in the case of aperiodic CSI reporting, the $n_{CQI\_ref}$ value is determined using N1 or N2. For instance, since the AP CSI-RS can be configured in the CSI process non-dedicated to the AP CSI-RS, the $n_{CQI\_ref}$ value is determined with reference to the sum of N1 and N2 (N1+N2) in the aperiodic CSI reporting.

In addition, according to the current LTE specification standard, CSI processes from index 0 to index max($N_x$-$N_u$, 0) are defined as CSI processes for updating CSI in the aperiodic CSI reporting. Here, $N_u$ indicates the number of unreported CSI processes associated with different aperiodic CSI for a serving cell. In the FDD system, $N_x$ is set to $N_{CSI-P}$. In the TDD system, when 4 CSI processes are configured for one serving cell, $N_x$ is set to $N_{CSI-P}$ but when 2 or 3 CSI processes are configured, $N_x$ is set to 3. As information provided by the UE to the network through UE capability reporting, $N_{CSI-P}$ indicates the maximum number of CSI processes that can be supported by the UE for the serving cell.

When the CSI is updated in the aforementioned aperiodic CSI reporting, N1 or N2 can be used. For example, $N_{CSI-P}$ may be changed to N1+N2.

It is a matter of course that the above-described AP CSI-RS is aperiodically transmitted. For example, the eNB may transmit the AP CSI-RS by applying a predetermined subframe offset k to subframe #n in which a periodic CSI request message is transmitted. In other words, the eNB may aperiodically transmit the AP CSI-RS in subframe #(n-k). Here, k may be informed the UE by the eNB and vice versa.

Figure 13:
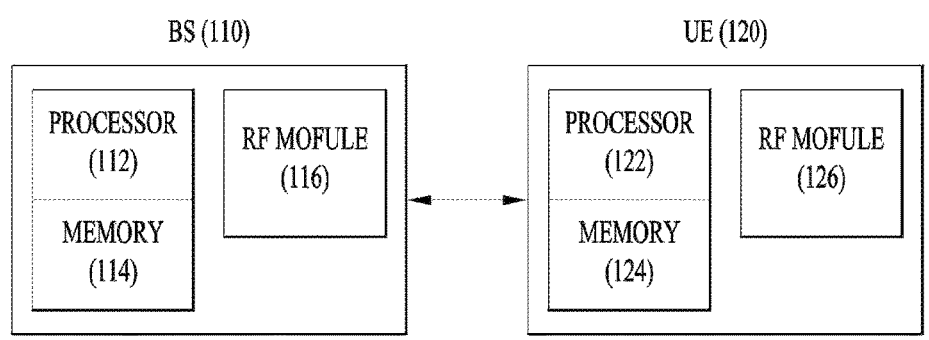
FIG. 13 is a diagram showing a BS and a UE which are applicable to the present invention.

FIG. 13 is a diagram showing a BS and a UE which are applicable to the present invention.

If a wireless communication system includes a relay, communication in a backhaul link is performed between the BS and the relay and communication in an access link is performed between the relay and the UE. Accordingly, the BS and UE shown in FIG. 13 may be replaced with the relay according to situation.

Referring to FIG. 13, a wireless communication system includes a BS 110 and a UE 120. The BS 110 includes a processor 112, a memory 114, and a Radio Frequency (RF) unit 116. The processor 112 may be configured so as to implement the procedures and/or methods proposed in the present invention. The memory 114 is connected to the processor 112 and stores various pieces of information related to operations of the processor 112. The RF unit 116 is connected to the processor 112 and transmits and/or receives RF signals. The UE 120 includes a processor 122, a memory 124, and an RF unit 126. The processor 122 may be configured so as to implement the procedures and/or methods proposed in the present invention. The memory 124 is connected to the processor 122 and stores various pieces of information related to operations of the processor 122. The RF unit 126 is connected to the processor 122 and transmits and/or receives RF signals. The BS 110 and/or the UE 120 may have a single antenna or multiple antennas.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although a method for transmitting an aperiodic reference signal for channel status information (CSI) feedback in a wireless communication system and device therefor are mainly described with reference to examples applied to the 3GPP LTE system, the method and device can be applied to various wireless communication systems as well as the 3GPP LTE system.

What is claimed is:

1. A method for transmitting channel status information (CSI) feedback by a user equipment (UE) in a wireless communication system, the method comprising:
configuring a single CSI process including a periodic reference signal and an aperiodic reference signal through a higher layer signal;
receiving an aperiodic CSI feedback request message related to the single CSI process from an evolved node B (eNB);
generating aperiodic CSI feedback based on the aperiodic reference signal;
generating periodic CSI feedback based on the periodic reference signal when a CSI feedback report period for the single CSI process is configured; and
transmitting, to the eNB, the aperiodic CSI feedback in response to the aperiodic CSI feedback request message and the periodic CSI feedback based on the CSI feedback report period,
wherein the UE selects one of the aperiodic CSI feedback and the periodic CSI feedback to be reported to the eNB, when the aperiodic CSI feedback and the periodic CSI feedback are triggered at the same time.

2. The method of claim 1, wherein CSI reference resources for the single CSI process are configured based on a number of reference signals included in the single CSI process.

3. The method of claim 1, wherein the aperiodic CSI feedback is related to vertical beamforming of the eNB.

4. The method of claim 1, wherein the periodic CSI feedback is related to horizontal beamforming of the eNB.

5. A user equipment (UE) in a wireless communication system, the UE comprising:
a transmitter and receiver for transmitting and receiving signals to and from an evolved node B (eNB); and
a processor for processing the signals, wherein the processor is configured to:
configure a single channel status information (CSI) process including a periodic reference signal and an aperiodic reference signal through a higher layer signal;
control the receiver to receive an aperiodic CSI feedback request message related to the single CSI process from an evolved node B (eNB);
generate aperiodic CSI feedback based on the aperiodic reference signal;
generate periodic CSI feedback based on the periodic reference signal, when a CSI feedback report period for the single CSI process is configured; and
control the transmitter to transmit, to the eNB, the aperiodic CSI feedback in response to the aperiodic CSI feedback request message and the periodic CSI feedback based on the CSI feedback report period,
wherein the UE selects one of the aperiodic CSI feedback and the periodic CSI feedback to be reported to the eNB, when the aperiodic CSI feedback and the periodic CSI feedback are triggered at the same time.

6. The UE of claim 5, wherein CSI reference resources for the single CSI process are configured based on a number of reference signals included in the single CSI process.

7. The UE of claim 5, wherein the aperiodic CSI feedback is related to vertical beamforming of the eNB.

8. The UE of claim 5, wherein the periodic CSI feedback is related to horizontal beamforming of the eNB.

* * * * *